UNITED STATES PATENT OFFICE.

LEONARDO WESTBROOK, OF NEW YORK, N. Y.

IMPROVEMENT IN GUTTA-PERCHA STEREOTYPE COMPOSITIONS.

Specification forming part of Letters Patent No. 9,870, dated July 19, 1853.

*To all whom it may concern:*

Be it known that I, LEONARDO WESTBROOK, of the city, county, and State of New York, have invented a new and improved composition of matter as a substitute for type-metal for the purpose of stereotyping and taking casts from type, cuts, engravings, and for embossing and other purposes, being an improvement on Josiah Warren's invention and process for similar purposes; and I do hereby declare that the following is a full and exact description of the same.

Article first. I first take shellac and plumbago or graphite, of each three parts, to which I add one part of asphaltum, melt and mix them thoroughly together. I then take thirteen parts gutta percha in its crude state and cut it into fine shreds with a cutting-machine constructed for the purpose. I then put the gutta-percha and the above-described compound into a grinding apparatus constructed for the purpose. I then make a solution of sulphate of copper in water in the proportions of one pound of sulphate of copper to one gallon of water. This solution, sufficient in quantity to cover the mass, is then heated to about 212° Fahrenheit and passed through a tube or siphon into the mass in a regular stream while the grinding apparatus is set in motion and the whole passed through it, after which the new compound thus formed is passed between iron rollers that are immersed in the heated solution of sulphate of copper and water in the same proportions as described above, and it is rolled out into thin sheets, and then, if found free from foreign substances, it is ready for use. The object of grinding and working the compound in the above-described solution is to destroy its elasticity and ductility and to render it sufficiently and permanently hard and cohesive when formed into plates, casts, dies, molds, or forms to withstand the necessary pressure or force requisite to produce the desired result. The new compound thus prepared I immerse in hot water, and when sufficiently soft I work it into the desired shape with my hands, being careful to keep a smooth and polished surface on one side by means of rubbing over it finely-powdered ivory-black or graphite. I then place the polished surface on the type, engraving, or other form from which a fac-simile is desired to be taken. I then put them into a press with a smooth and level bed-plate and platen, between which and on each side of the form to be taken are placed two bearers of solid material one-eighth of an inch thicker than the type or form. The platen of the press is then brought down until it presses firmly on the bearers, where it is retained until the composition becomes cool and hardened, which requires from five to ten minutes, when it is then taken out of the press and the composition is removed from the form, and it is then an exact matrix or mold of the form on which it has been impressed. I then place this matrix or mold on a block of mahogany or other hard wood of the desired length and breadth and a quarter of an inch thinner than the bearers; and after preparing another portion of my composition in the same manner as described above I place it on the mold, put it in the press, and bring the platen down to the bearers, as before, and retain it there until it is cool, when it is taken out, the mold removed, and the plate, being an exact fac-simile of the original, is ready for printing.

Article second. Hylographing and the manner of taking impressions therefrom for the production of plates for printing music, drawings, maps, bank-notes, fine, close, clouded, or shaded work, either as part of a picture or tinted ground, and upper and lower dies for embossing or molding. I take a piece of box or other finely-grained wood of the size and thickness required, and with suitable and peculiar-shaped instruments I design, engrave, or impress the object or subject desired. This being done, I take an impression with my compound herein specified from the block in the following manner: First, I confine the block in a chase one-eighth of an inch higher than the surface or level of the block. I then take a sufficient quantity of my compound to form a plate in its soft or yielding state, which I mold in proper form. I then rub on the part that will come in contact with the wood, ivory-black, or graphite, which destroys its adhesive qualities. It is then laid upon the block and put to press, the platen of which, being perfectly level, is brought to bear upon the chase. By this process I produce a fac-simile of the design, which may be printed from as soon as blocked in the manner described in article first.

Article third. When the above-specified compound is to be used for embossing paper, foil, silk, or any other yielding substance or material, either from dies in wood, steel, or any other substance, I secure the die on the bed-plate of an embossing-press. I then take a sufficient quantity of my composition in its yielding state, and after molding it with the hands to its proper form and applying the ivory-black or graphite for the purpose as specified in article second, I place it against the lick-up, which is attached to the plunger, by the downward movement of which the composition is brought in contact and is compressed into the die. It remains in this position until cool, when the plunger may be raised, and the composition will adhere to the lick-up. I am now furnished with an upper force or die for embossing which will give a sharper impression, is more durable, and requires less time for its adjustment than by any other process or materials now in use.

Article fourth. For the production of articles practical and useful from said compound—such as jewelers' cases, daguerreotype-cases, fancy boxes, or the duplicating of elaborate carved work—this is my process of working my composition into any of the above-named articles. Furnished with a model of the article to be duplicated, I procure a chase of proper dimensions, in which I place a sufficient quantity of my compound in its yielding state, covering the surface of it, as before specified, with ivory-black, graphite, or pearl-powder. On it I place my model. I then put it to press, the platen of which is brought to bear upon the chase. When the compound has cooled I remove the model and the mold is formed, from which, by a second application of my composition, prepared in the same manner, and the use of a proper shaped follower, I produce a fac-simile of the model. In the second application it is necessary to use bearers of a proper thickness between the platform and platen of the press.

What I claim as my invention and improvement on the patent of Josiah Warren, dated April 25, 1846, and desire to secure by Letters Patent, is—

The compound herein described of shellac, plumbago or graphite, asphaltum, and gutta-percha, treated by sulphate of copper and water, in the manner described, as a substitute for type-metal.

LEONARDO WESTBROOK.

Witnesses:
ABM. L. BOGERT,
T. S. SMITH.